Figure 1:
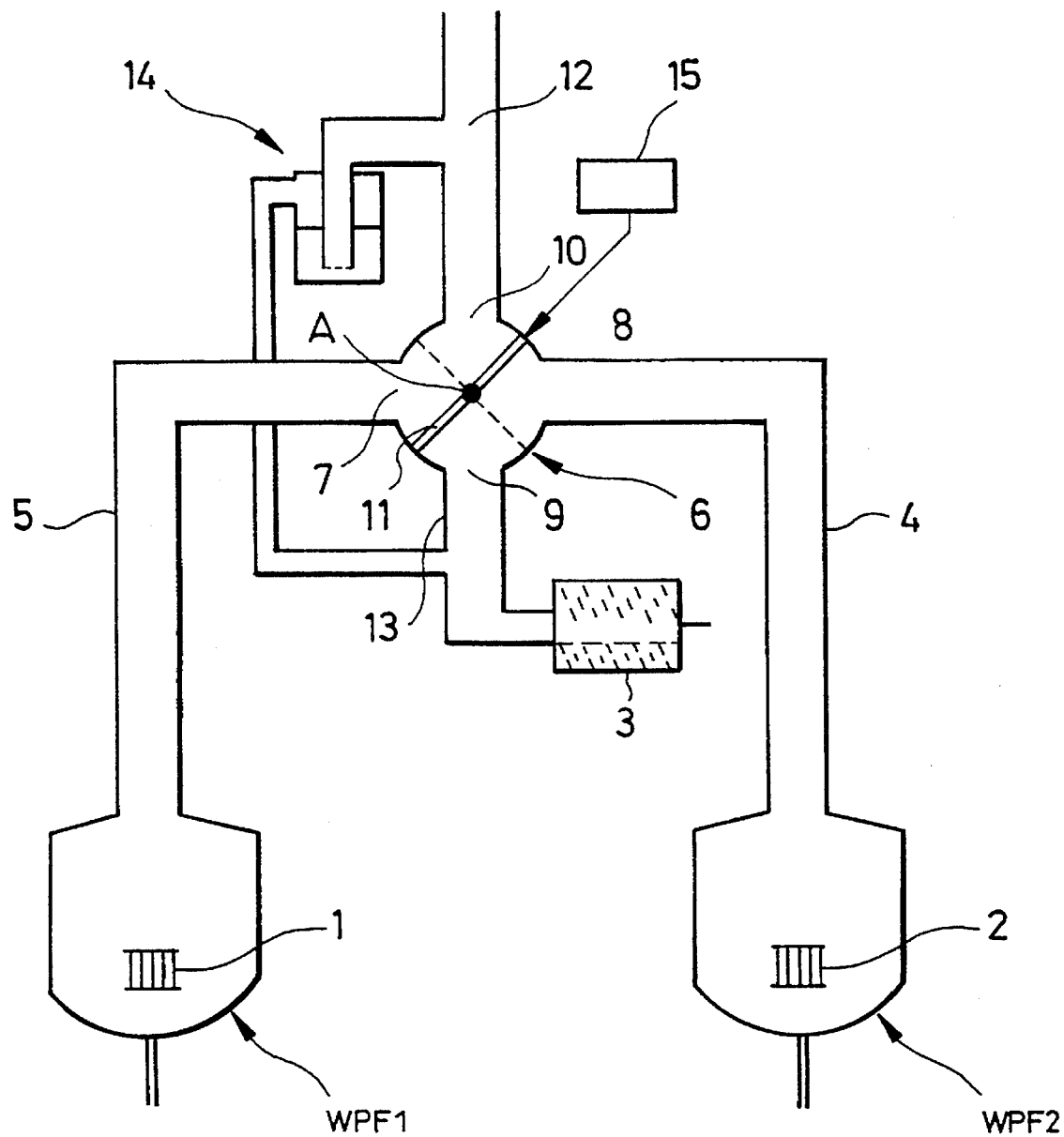

United States Patent [19]
Klein

[11] Patent Number: 5,497,694
[45] Date of Patent: Mar. 12, 1996

[54] BREWING HOUSE SYSTEM INCLUDING AT LEAST TWO WORT COPPERS

[75] Inventor: Martin Klein, Nandlstadt, Germany

[73] Assignee: Anton Steinecker Entwicklungs GmbH & Co., Freising/Attaching, Germany

[21] Appl. No.: 304,877

[22] Filed: Sep. 13, 1994

[30] Foreign Application Priority Data

Sep. 17, 1993 [DE] Germany ............................ 9314102 U

[51] Int. Cl.⁶ .................................................. C12F 3/02
[52] U.S. Cl. ............................................................. 99/276
[58] Field of Search ......................... 99/276, 277, 277.1, 99/278, 480; 137/625.46

[56] References Cited

U.S. PATENT DOCUMENTS

| | | | |
|---|---|---|---|
| 490,056 | 1/1893 | Zwietusch | 99/276 |
| 554,851 | 2/1896 | Wittemann | 99/276 |
| 963,458 | 7/1910 | Moeller | 99/276 |
| 1,043,361 | 11/1912 | Römer | 99/276 |
| 2,333,154 | 11/1943 | Markus et al. | 99/276 |
| 2,663,154 | 12/1953 | Craig | 99/276 |
| 3,062,656 | 11/1962 | Agabalianz et al. | 99/276 |
| 3,095,889 | 7/1963 | Barroll et al. | 137/625.46 |
| 3,228,653 | 1/1966 | Trimmer | 137/625.46 |
| 3,486,437 | 12/1969 | Bazhenov et al. | 99/276 |
| 3,627,544 | 12/1971 | Bosewitz et al. | 99/276 |
| 3,956,073 | 5/1976 | Carbone et al. | 137/625.46 |
| 4,009,286 | 2/1977 | Moll et al. | 99/276 |
| 4,388,857 | 6/1983 | Korek | 99/276 |
| 4,483,881 | 11/1984 | Lenz | 99/276 |
| 4,813,346 | 3/1989 | Widhopf | 99/276 |
| 4,908,219 | 3/1990 | Modot et al. | 99/276 |

*Primary Examiner*—David Scherbel
*Assistant Examiner*—Tony G. Soohoo
*Attorney, Agent, or Firm*—Tilton, Fallon, Lungmus & Chestnut

[57] ABSTRACT

The present invention refers to a brewing house system including at least two wort coppers connected to the vapour compression system via copper ventilating pipes. In order to simplify such a brewing house system with respect to the structural expenditure required, the present invention provides the features that two pipe sections of the copper ventilating pipes are connected to a common change-over device, each of said pipe sections leading away from one wort copper and said change-over device connecting one of the two wort coppers to the vapour compression system in accordance with its respective switching position.

4 Claims, 2 Drawing Sheets

BREWING HOUSE SYSTEM INCLUDING AT LEAST TWO WORT COPPERS

DESCRIPTION

The present invention refers to a brewing house system including at least two wort coppers connected to a vapour compression system via copper ventilating pipes.

In large brewing house systems, it is common practice to brew beer with two or even more than two wort coppers. The brewing process in the individual wort coppers takes place successively so that a rapid brewing succession and, consequently, a high output can be achieved.

The vapour produced during the cooking process represents a source of waste heat the energy of which can be utilized by making use of vapour compression systems. For this purpose, the vapour produced is supplied via copper ventilating pipes to the vapour compression system where it is compressed. During the subsequent condensation it will give off its heat. The energy thus recovered can then be used again in the brewing house system, e.g. for preheating the wort running into the wort copper.

In known brewing house systems including at least two wort coppers, a copper ventilating pipe leads from each wort copper to the outgoing air side, i.e. into the open air; however, the outlet can in this case be blocked by means of a flap and the vapour can be rerouted to the vapour compression system by opening a flap arranged in a pipe branch which branches off the copper ventilating pipe. In addition, a so-called surge chamber acting as an excess pressure/underpressure safety means is provided in each copper ventilating pipe of each wort copper.

Known systems of the above-mentioned type are disadvantageous insofar as they require a comparatively high structural expenditure. A separate surge chamber has to be arranged for each wort copper and, in addition, at least two change-over flaps have to arranged in each copper ventilating pipe in front of each wort copper, and this will involve considerable expenses.

Hence, it is the object of the present invention to simplify a brewing house system of the type including at least two wort coppers connected to a vapour compression system via copper ventilating pipes, and with respect to the structural expenditure required, especially as far as the connection of the wort coppers to the vapour compression system is concerned.

This object is achieved by the measure of connecting two pipe sections of the copper ventilating pipes to a common change-over device, each of said pipe sections leading away from one worst copper and said change-over device connecting one of the two wort coppers to the vapour compression system in accordance with its respective switching position.

On the basis of this measure, it is possible to connect to the vapour compression system the respective wort copper which is in operation, the change to the other wort copper being now possible simply by switching over the change-over device. The shut-off flaps provided in the respective pipe sections of the copper ventilating pipes according to the prior art are consequently no longer necessary. In addition, it is possible to use only one surge chamber for two wort coppers by connecting in parallel the surge chamber of the change-over device according to one embodiment of the present invention.

The change-over device is preferably constructed as a flap housing with two inlet and two outlet connections. The two wort coppers can then be connected to two oppositely arranged inlet connections, whereas the outlet connections can have connected thereto the connection pipe leading to the vapour compression system on the one hand and the discharge pipe on the other.

In a brewing house system comprising four wort coppers, two respective wort coppers are preferably connected to one common change-over device, and the two vapour compressor outlet connections of each change-over device are connected to the inlet connections of a third change-over device. In the case of this embodiment, a single surge chamber can be connected in parallel with all three change-over devices so that only three change-over devices, preferably in the form of flap housings, and one surge chamber are required for connecting four wort coppers.

In the following, the explanation and the description of the present invention will be continued on the basis of two embodiments.

Figure 2:
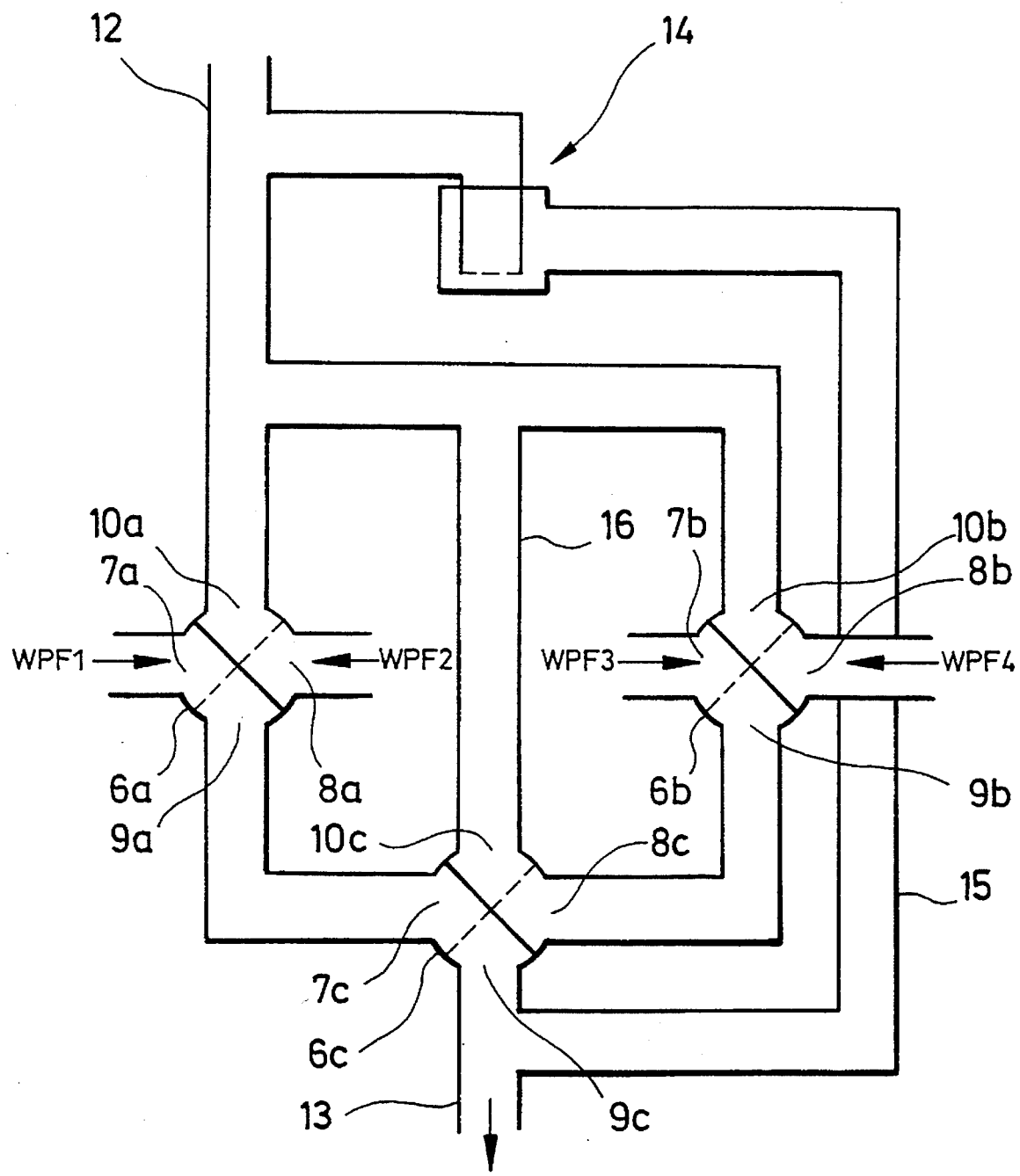

FIG. 1 shows a greatly simplified scheme of a brewing house system in which the present invention has been realized, and FIG. 2 shows the arrangement of three flap housings used for the purpose of connecting four wort coppers to a vapour compression system.

FIG. 1 shows, in a greatly simplified representation, a wort copper WPF1 and a wort copper WPF2. The two wort coppers are components of an otherwise conventionally constructed brewing house system. They have internal boilers 1, 2 by means of which the wort can be heated in the wort coppers during the brewing process.

Pipe sections 4 and 5, which lead away from the wort coppers, are attached to the top of said wort coppers, said pipe sections 4 and 5 being connected to the inlet connections 8 and 7, respectively, of the change-over device 6 constructed in the form of a flap housing. Said flap housing 6 is provided with a pivotable flap 11 adapted to be pivoted about the pivot axis A, said pivotable flap being adapted to be rotated electrically via a switch box 15 and to be moved from the position indicated by the solid line to the position indicated by the broken line. At both positions, the pivotable flap 11 sealingly abuts on the housing wall sections of the flap housing 6. The two inlet connections 7 and 8 are arranged in opposed relationship with each other at the flap housing 6, and, displaced by 90° with respect to said inlet connections 7 and 8, the two outlet connections 9 and 10 are arranged in opposed relationship with each other. The outlet 10 communicates with a discharge pipe 12 terminating in the open air, whereas the outlet connection 9 is connected to the vapour compression system 3 via the connection pipe 13.

The surge chamber 14 is connected in parallel between the discharge pipe 12 and the connection pipe 13, said surge chamber 14 serving as an excess pressure/underpressure safety means in a manner known.

The connection to connection pipe 13 is, again in a manner known, established via a line.

The basic operation of this system is as follows:

when the pivotable flap 11 of the flap housing 6 occupies the position indicated by a solid line, the vapour produced during the cooking process in the wort copper WPF2 is introduced via the pipe section 4 through the pivotable flap 11 into the connection pipe 13 and is thus guided to the vapour compression system 3. The wort copper WPF1, however, is connected to the discharge pipe 12. When the cooking process in the wort copper WPF2 has been finished and when cooking is to be continued in the wort copper WPF1, the pivotable flap is pivoted via the electric control means 15 to the position indicated by a broken line so that the wort copper WPF1 will then be connected to the vapour compression system 3 and the wort copper WPF2 will be connected to the discharge means. The two wort coppers can thus selectively be connected to the vapour compression system in a very simple manner and with little effort as far as the devices and the circuit technology used are concerned.

In the embodiment shown in FIG. 2, the brewing house system is provided with four wort coppers WPF1 to WPF4. Wort coppers WPF1 and WPF2 are connected to the inlet connections 7a and 8a of the flap housing 6a, whereas wort coppers WPF3 and WPF4 are connected to the inlet connections 7b and 8b of the second flap housing 6. The vapour outlets 9a and 9b of the two flap housings 6a and 6b are connected to the inlet connections 7c and 8c of the third flap housing 6c. The surge chamber 14 is again connected in parallel with these three flap housings by being connected between the discharge pipe 12, which is common to all three flap housings, and the connection pipe 13 which leads to the vapour compression system. It follows that all three flap housings are secured against excess pressure and underpressure by means of a surge chamber.

At the position shown in FIG. 2, the wort copper WPF1 is in operation, i.e. the vapour of said wort copper WPF1 is advanced to the vapour compression system via the flap housing 6a and the flap housing 6c as well as the connection pipe 13, whereas the other three wort coppers are connected to the discharge means 12.

If it is now intended to put the wort copper WPF2 in operation, the pivotable flap of the flap housing 6a is pivoted to the position indicated by a broken line, whereas the positions of the two other pivotable flaps are maintained.

Accordingly, the pivotable flap of the flap housing 6c will be pivoted to the position shown by a broken line in FIG. 2 for operating the wort coppers WPF3 and WPF4, respectively, whereupon either the wort copper WPF3 or the wort copper WPF4 will be operated selectively by pivoting the pivotable flap of the flap housing 6b.

In addition, reference is made to the fact that the term wort coppers as used in the present invention also comprises whirlpool coppers. In this connection it makes no difference whether the wort or whirlpool coppers are provided with internal boilers or external boilers. On the contrary, the present invention is adapted to be used for wort and whirlpool coppers with internal boilers as well as for those with external boilers. Furthermore, when a surge chamber is mentioned as an excess pressure/underpressure safety means in the text of the present application, this should only be regarded as an example. The present invention will be equally useful in cases where the excess pressure/underpressure safety means can be realized in a different way, especially by conventional electric, mechanical or electromagnetic safety devices.

I claim:

1. A brewing house system comprising:

at least two wort coppers connected to a vapor compression system via copper ventilating pipes; and a first change-over device connected to said copper ventilating pipes and being constructed as a housing having two inlet connections and two outlet connections and having a pivotable flap arranged therein which is adapted to be rotated about an axis between a first and second position; said copper ventilating pipes including two pipe sections which respectively connect said at least two wort coppers to said two inlet connections of said change-over device and said two outlets of said change-over device being respectively connected to said vapor compression system and a discharge means, whereby said flap connects one of said at least two wort coppers to said vapor compression system and connects the other of said at least two wort coppers to said discharge means when in said first position and connects said other of said at least two wort coppers to said vapor compression system and said one of said at least two wort coppers to said discharge means when in said second position.

2. The brewing house system according to claim 1 in which said discharge means is connected to a surge chamber.

3. The brewing house system according to claim 1 in which said at least two wort coppers includes four wort coppers, two of said four wort coppers being connected to a second change-over device which they have in common and the other two of said four wort coppers being connected to a third change-over device which they have in common, said second and third change-over devices each having a vapor compressor outlet respectively connected to said two inlet connections of said first change-over device.

4. The brewing house system accordingly to claim 3 in which said first, second and third change-over devices each has an outlet connected to a surge chamber.

\* \* \* \* \*